(12) United States Patent
Song et al.

(10) Patent No.: US 8,624,825 B2
(45) Date of Patent: Jan. 7, 2014

(54) TRANSFLECTIVE DISPLAY APPARATUS HAVING ALL-IN-ONE TYPE LIGHT GUIDE PLATE

(75) Inventors: Hoon Song, Yongin-si (KR); Hong-seok Lee, Seongnam-si (KR); Yong-kweun Mun, Yongin-si (KR); Yoon-sun Choi, Incheon (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 724 days.

(21) Appl. No.: 12/585,488

(22) Filed: Sep. 16, 2009

(65) Prior Publication Data

US 2010/0118065 A1 May 13, 2010

(30) Foreign Application Priority Data

Nov. 10, 2008 (KR) ........................ 10-2008-0111222

(51) Int. Cl.
*G09G 3/34* (2006.01)

(52) U.S. Cl.
USPC .............................. 345/102; 345/87

(58) Field of Classification Search
None
See application file for complete search history.

(56) References Cited

U.S. PATENT DOCUMENTS

| | | | |
|---|---|---|---|
| 5,566,007 A | | 10/1996 | Ikeda et al. |
| 5,771,328 A | * | 6/1998 | Wortman et al. ............. 385/146 |
| 6,285,426 B1 | * | 9/2001 | Akins et al. .................. 349/114 |
| 2011/0051047 A1 | * | 3/2011 | O'Neill et al. ................. 349/67 |

FOREIGN PATENT DOCUMENTS

| | | |
|---|---|---|
| JP | 10-246784 | 9/1998 |
| JP | 2001-184925 | 7/2001 |
| JP | 2001-201746 | 7/2001 |
| JP | 2002-025320 | 1/2002 |
| JP | 2002-025323 | 1/2002 |
| JP | 2003-373518 | 12/2002 |
| JP | 2004-013174 | 1/2004 |
| JP | 2006-085954 | 3/2006 |
| KR | 10-1995-0009299 | 4/1995 |
| KR | 10-2005-0070454 | 7/2005 |

* cited by examiner

*Primary Examiner* — Joseph Haley
(74) *Attorney, Agent, or Firm* — Harness, Dickey & Pierce P.L.C.

(57) ABSTRACT

A display apparatus according to example embodiments may include a light source; an all-in-one type light guide plate; a reflective plate; and a display panel. The all-in-one type light guide plate may include a light guide member and light emitting members, wherein the light guide member reflects light incident from the light source toward the light emitting members, and the light emitting members protrude from one side of the light guide member and emit light incident from the light guide member. The light guide member and the light emitting members may be integrally formed or individually combined to form an all-in-one type light guide plate. The display apparatus may form an image using light from a backlight unit and external light.

16 Claims, 12 Drawing Sheets

TRANSFLECTIVE DISPLAY APPARATUS HAVING ALL-IN-ONE TYPE LIGHT GUIDE PLATE

CROSS-REFERENCE TO RELATED APPLICATION

This application claims priority under 35 U.S.C. §119 to Korean Patent Application No. 10-2008-0111222, filed on Nov. 10, 2008 with the Korean Intellectual Property Office, the entire disclosure of which is incorporated herein by reference.

BACKGROUND

1. Field

Example embodiments relate to a display apparatus in which light illuminated from a backlight unit is used along with external light as an image forming light.

2. Description of the Related Art

With the increased use of portable devices (e.g., mobile phones, personal digital assistants (PDAs), portable multimedia players (PMPs), and digital multimedia broadcasting (DMB) devices) has come the increased demand for displays with lower power consumption and improved outdoor visibility. Research has been conducted in an attempt to attain a transflective liquid crystal display (LCD) which has a combined form of a reflective display device and a transmittive display device. In a transflective LCD, an image is formed using light from a backlight unit and/or external light. Thus, when the transflective LCD is used in a relatively bright environment (e.g., with sunlight), display visibility may be satisfactorily attained while reducing power consumption. However, liquid crystal cells in a transflective LCD are divided into two regions, a reflective region and a transmittive region. As a result of the incident light being divided by the two regions, there may be a decline in luminance. Furthermore, the manufacturing process for the transflective LCD may be more complex than conventional displays.

SUMMARY

Example embodiments of the present application relate to a display apparatus that provides adequate luminance and outdoor visibility while having a relatively low power consumption. A display apparatus according to example embodiments may include a light source; an all-in-one type light guide plate including a light guide member and light emitting members, wherein the light guide member reflects light incident from the light source toward the light emitting members, and the light emitting members protrude from a first surface of the light guide member and emit light incident from the light guide member; a reflective plate on a second surface of the all-in-one type light guide plate, the second surface being on an opposing side of the light guide member from the first surface; and a display panel configured to modulate light emitted from the all-in-one type light guide plate to form an image.

The display panel may be a liquid crystal panel. Alternatively, the display panel may be a polymer dispersed liquid crystal (PDLC) panel in which black dye is mixed with PDLC. The display panel may also be an electro-wetting display panel which modulates light using an electro-wetting material. The display panel may also be an electrochromic display panel which modulates light using an electrochromic element. The reflective plate may be a scattering type reflective plate, a directional reflective plate, or a mirror type reflective plate. The display apparatus may further include a scattering plate between the all-in-one type light guide plate and the display panel.

Each of the light emitting members may have a larger cross-section for a first portion where light is emitted than a cross-section for a second portion where light is incident from the light guide member. A distribution density of the light emitting members may increase with increasing distance of the light emitting members from the light source. A size of the light emitting members may also increase with increasing distance of the light emitting members from the light source. The display apparatus may further include an optical sensor configured to detect external light intensity; and a control unit configured to control brightness of the light source according to the external light intensity detected by the optical sensor.

BRIEF DESCRIPTION OF THE DRAWINGS

The above and/or other aspects of example embodiments may become more readily appreciated when the detailed description herein is read in conjunction with the accompanying drawings of which.

DETAILED DESCRIPTION

Figure 1:
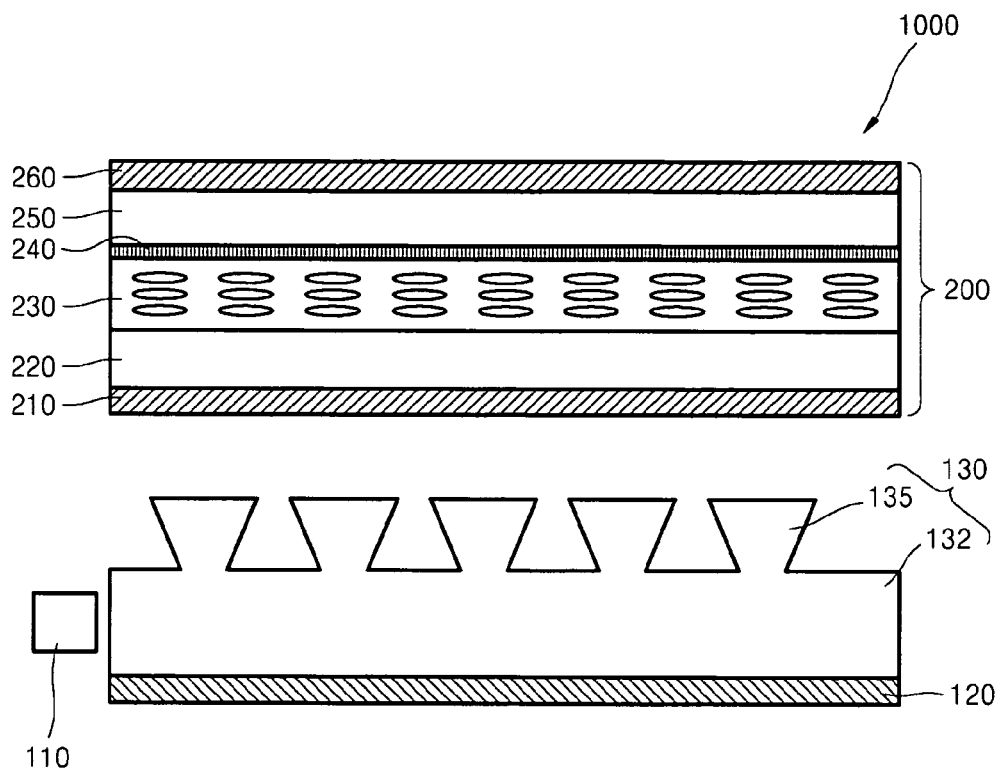
FIG. 1 is a cross-sectional view of a display apparatus according to example embodiments.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items. The size, thickness, and/or positioning of the various layers and/or regions may have been exaggerated for clarity.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view of a display apparatus according to example embodiments. Referring to FIG. 1, the display apparatus 1000 includes a backlight unit and a display panel 200. The backlight unit includes a light source 110, an all-in-one type light guide plate 130, and a reflective plate 120.

The display apparatus 1000 may use light from the backlight unit and external light as an image forming light. Accordingly, the all-in-one type light guide plate 130 includes a light guide member 132 and light emitting members 135, wherein the light guide member 132 reflects light incident from the light source 110 inside and the light emitting members 135 protrude from one side of the light guide member 132 and emit light incident from the light guide member 132 to the outside. The light guide member 132 and the light emitting members 135 are combined to form all-in-one type light guide plate and an optical boundary does not exist between the light guide member 132 and the light emitting members 135. The all-in-one type light guide plate 130 may be manufactured by forming the light emitting members 135 in a relief shape on one side of the light guide member 132 so as to integrally form an all-in-one type light guide plate or by connecting the separately formed light guide member 132 and the light emitting members 135 without an optical boundary therebetween.

The cross-section of the upper portion (from which light is emitted) of each of the light emitting members 135 may be larger than the cross-section of the lower portion (on which light is incident from the light guide member 132). The form and distribution of the light emitting members 135 illustrated in FIG. 1 is not limited thereto and the light emitting members 135 may be any form that emits light to the outside, wherein the light is incident from the light source 110, which is disposed at the side of the light guide member 132. For example, in order to make luminance of light emitted from the all-in-one type light guide plate 130 as uniform and high as possible, the light emitting members 135 may have a denser distribution as the light emitting members 135 gradually get farther from the light source 110. In other words, the number of the light emitting members 135 located farther from the light source 110 may be larger than the number of the light emitting members 135 located closer to the light source 110.

In addition, the size of the light emitting members 135 may increase as the light emitting members 135 gradually get farther from the light source 110. The cross-sections of the light emitting members 135 are not limited to the reversed trapezoid shape shown in FIG. 1 and may be in the form of other appropriate shapes. The form and distribution of the light emitting members 135 may be determined according to the type of light source 110. For example, when a point source such as a light emitting diode (LED) is used as the light source 110, the form of the upper surfaces of the light emitting members 135 may have a round shape, in order to obtain a round shape of angular distribution of emitted light. The all-in-one type light guide plate 130 may be formed of a transparent and flexible material (e.g., polydimethylsiloxane).

The light source 110 may be disposed on one side of the all-in-one type light guide plate 130. A point source (e.g., an LED) or a line source (e.g., Cold Cathode Fluorescent Lamps (CCFLs)) may be used as the light source 110. In addition, a plurality of point sources may be used or means for converting a point source into a line source may be used along with the point sources.

The reflective plate 120 may be disposed on the lower surface of the all-in-one type light guide plate 130 (e.g., the surface opposite to the surface with the light emitting members 135). The reflective plate 120 may reflect external light incident through the light emitting members 135 toward the light emitting members 135. Also, the reflective plate 120 may support light incident from the light source 110 being reflected in the light guide member 132. When light from the light source 110 reaches the lower surface of the light guide member 132, most of light has an incidence angle in which light is totally reflected. However, some light incident with an angle smaller than a critical angle of total reflection is also reflected in the light guide member 132 by the reflective plate 120.

The reflective plate 120 may be a scattering type reflective plate or a directional reflective plate. The scattering type reflective plate includes a scattering pattern formed thereon for scattering and reflecting incident light. The directional reflective plate includes a diffraction pattern formed thereon in which the diffraction efficiency of a specific direction is designed to be relatively high. As such, use of the scattering type reflective plate or the directional reflective plate may reduce the possibility that an image formed by the display panel 200 will be reflected by the reflective plate 120 and overlapped on a display surface of the display panel 200 compared to when the reflective plate 120 is formed of a mirror type reflective plate.

The display panel 200 may modulate light emitted from the all-in-one type light guide plate 130 and form an image. The display panel 200 may be a liquid crystal panel. The display panel 200 includes first and second substrates 220 and 250 and a liquid crystal layer 230 interposed between the first substrate 220 and the second substrate 250. The first and second substrates 220 and 250 are transparent and may be formed of glass. First and second polarizers 210 and 260 are respectively disposed on the outer surface of the first and second substrates 220 and 250. The polarizing axis of the first and second polarizers 210 and 260 may be perpendicular to each other. A color filter 240 for forming colors is disposed on the inner surface of the second substrate 250. Although not illustrated, pixel electrodes and thin film transistor (TFT) layers may be further disposed to control the liquid crystal layer 230 in correspondence to each of pixels.

Figure 2A:
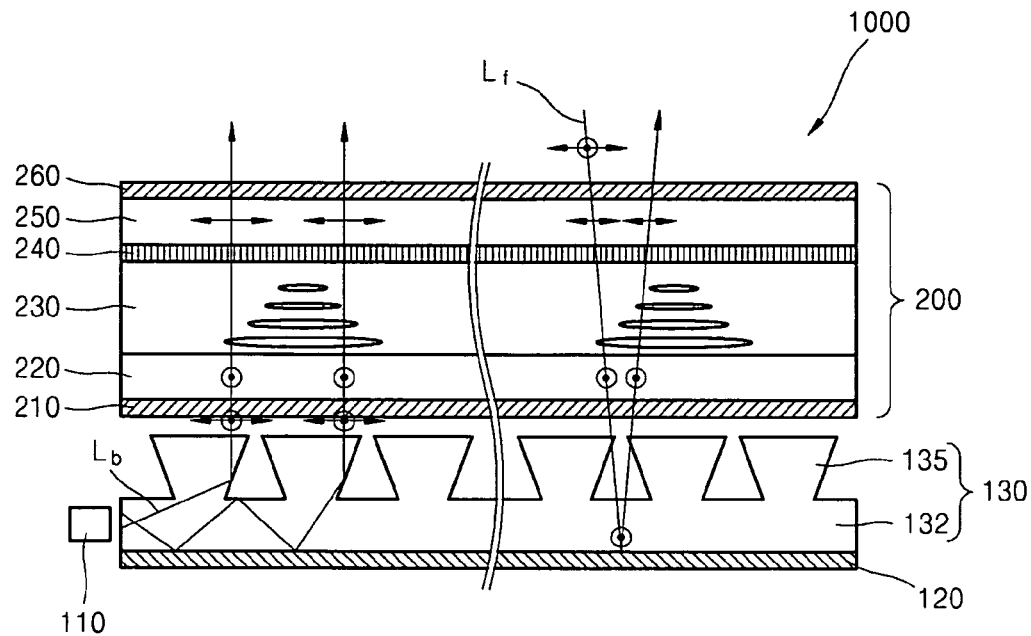
FIGS. 2A and 2B are cross-sectional views of the display apparatus of FIG. 1 modulating external light and light from a backlight unit.
Figure 2B:
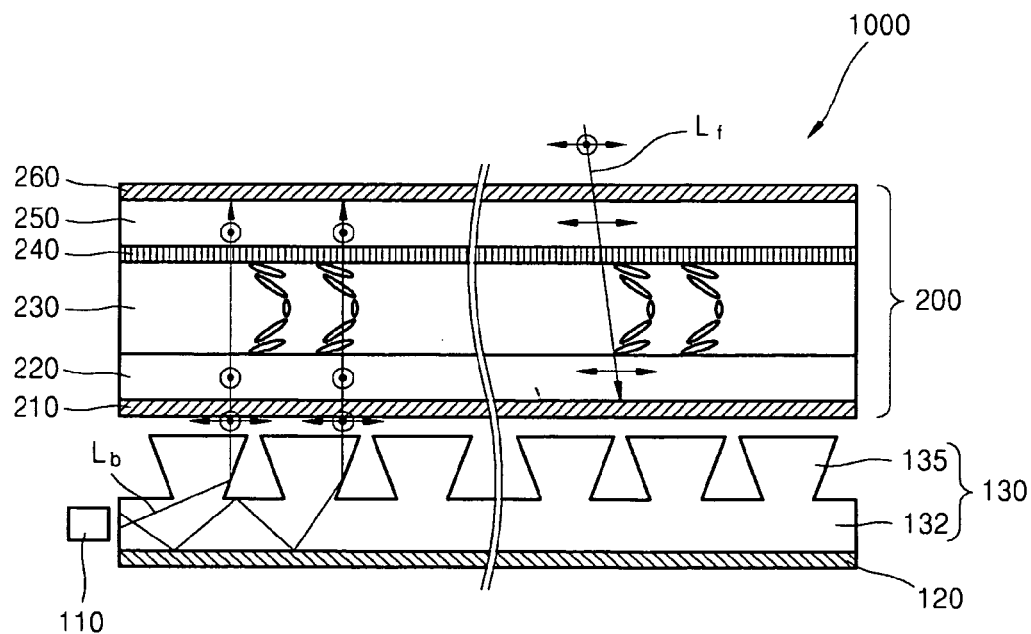

FIGS. 2A and 2B are cross-sectional views of the display apparatus of FIG. 1 modulating external light $L_f$ and light $L_b$ from the backlight unit. Referring to FIG. 2A, the polarization of light $L_b$ incident from the light source 110 onto the all-in-one type light guide plate 130 and emitted from the light emitting members 135 is changed into first polarized light by the first polarizer 210. In FIG. 2A, an electric field is not applied to the liquid crystal layer 230, and the polarization of light $L_b$ incident to the liquid crystal layer 230, which passes through the liquid crystal layer 230, is changed into second polarized light, which is perpendicular to the first polarized light. Next, light $L_b$ in the second polarized light state passes through the color filter 240 so as to have a corresponding color and passes through the second polarizer 260 through which second polarized light, which is perpendicular to the first polarized light, is transmitted, thereby generating a pixel-on state.

External light $L_f$ incident from the front of the display panel 200 may also be an image forming light. External light $L_f$ passes through the second polarizer 260 and is changed into second polarized light. Then, second polarized light passes through the liquid crystal layer 230, to which an electric field is not applied, and is changed into first polarized light, thereby passing through the first polarizer 210, through which first polarized light is transmitted. Next, external light $L_f$ is incident to the all-in-one type light guide plate 130 through the light emitting members 135 and is reflected at the reflective plate 120, thereby being emitted through the light emitting members 135. The emitted light passes through the first polarizer 210, the liquid crystal layer 230, the color filter 240, and the second polarizer 260, thereby generating a pixel-on state representing the color corresponding to the color filter 240.

In FIG. 2B, an electric field is applied to the liquid crystal layer 230 and liquid crystals are arranged therein along the direction of the electric field. Thus, polarization of light passing through the liquid crystal layer 230 is not changed. Light incident to the all-in-one type light guide plate 130 from the light source 110, emitted through the light emitting members 135, and incident to the display panel 200, passes through the first polarizer 210 and is changed into first polarized light. Then, light changed into first polarized light passes through the liquid crystal layer 230 and is maintained as the first polarized light. Accordingly, the light does not pass through the second polarizer 260, through which second polarized light is transmitted, thereby generating a pixel-off state. When external light $L_f$ passes through the second polarizer 260, the external light $L_f$ is changed into second polarized light and passes through the liquid crystal layer 230, while maintaining the second polarized light state. Thus, the light is absorbed in the first polarizer 210, thereby generating a pixel-off state.

Figure 3:
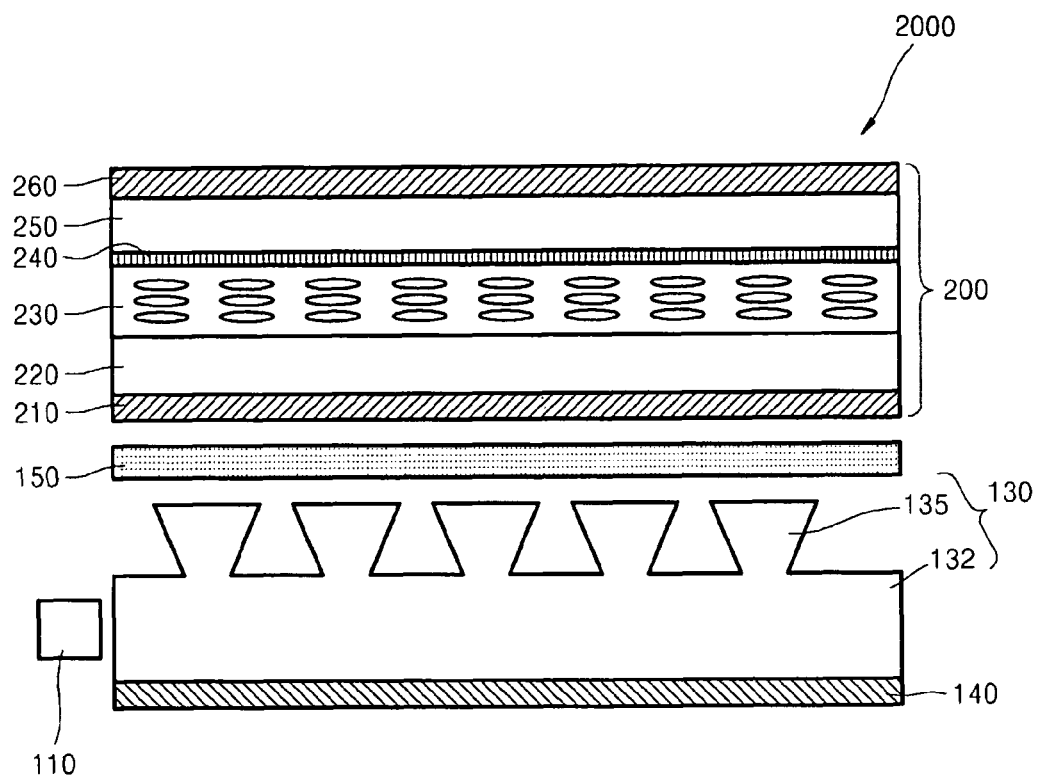
FIG. 3 is a cross-sectional view of another display apparatus according to example embodiments.

FIG. 3 is a cross-sectional view of another display apparatus according to example embodiments. The display apparatus 2000 includes a backlight unit and the display panel 200. The backlight unit includes the light source 110, the all-in-one type light guide plate 130, a reflective plate 140, and a scattering plate 150. The display apparatus 2000 of FIG. 3 is different from the display apparatus 1000 of FIG. 1 in that the reflective plate 140 may be a mirror type reflective plate and the scattering plate 150 is interposed between the all-in-one type light guide plate 130 and the display panel 200 in FIG. 3, whereas the reflective plate 120 may be a scattering type reflective plate or a directional reflective plate in FIG. 1. Because the mirror type reflective plate 140 and the scattering plate 150 are employed, images formed on the display panel 200 are reflected by the reflective plate 140 and thus the possibility that the overlapped image appears on the display surface of the display panel 200 may be reduced. A principle of forming an image in the display apparatus 2000 by using light from the backlight unit and external light is substantially the same as that of in the display apparatus 1000 in FIGS. 2A and 2B.

Figure 4:
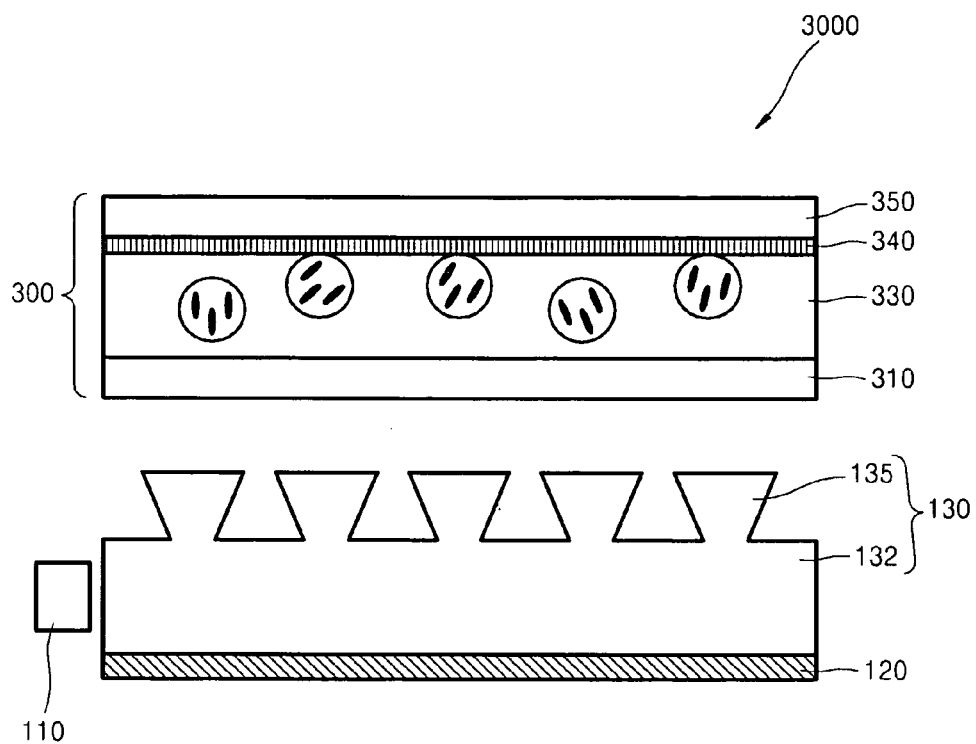
FIG. 4 is a cross-sectional view of another display apparatus according to example embodiments.

FIG. 4 is a cross-sectional view of another display apparatus according to example embodiments. The display apparatus 3000 may have a backlight unit (including the light source 110, the all-in-one type light guide plate 130, and the reflective plate 120) and a polymer dispersed liquid crystal (PDLC) panel 300. The display apparatus 3000 of FIG. 4 is different from the display apparatus 1000 of FIG. 1 in that a PDLC panel 300 is employed in the display apparatus 3000.

The PDLC panel 300 includes a PDLC layer 330 formed by mixing black dye with PDLCs, wherein the PDLC layer 330 is interposed between a first substrate 310 and a second substrate 350. When an electric field is not applied to the PDLCs, the PDLCs scatter incident light due to a permittivity difference of polymers and liquid crystals. When an electric field is applied to the PDLCs, a permittivity difference between liquid crystals arranged along the electric field and polymers is reduced and the PDLCs become transparent, thereby having a characteristic of allowing light to pass through. In the PDLC layer 330 formed by mixing black dye with PDLC, when an electric field is not applied to the PDLC layer 330 and the PDLC scatters light, light is absorbed in the PDLC layer 330 by the black dye, thereby respectively generating a pixel-off state. On the other hand, when an electric field is applied to the PDLC layer 330, light passes through the PDLC layer 330, thereby generating a pixel-on state. Unlike a general liquid crystal panel, the polarization of incident light is not used. As a result, a polarizing plate is not needed. A color filter 340 for expressing a color may be disposed on the inner surface of the second substrate 350. In addition, although not illustrated, pixel electrodes and TFT layers for controlling the PDLC layer 330 in correspondence to each pixel may also be employed.

Figure 5A:
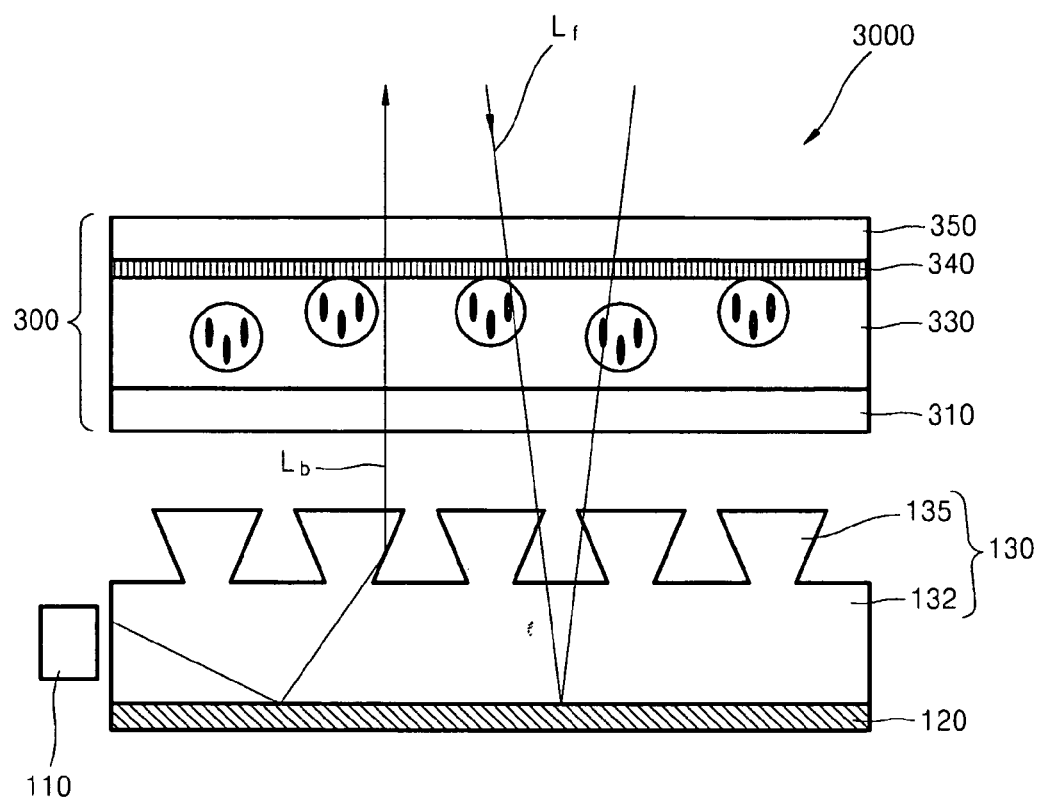
FIGS. 5A and 5B are cross-sectional views of the display apparatus of FIG. 4 modulating external light and light from a backlight unit.
Figure 5B:
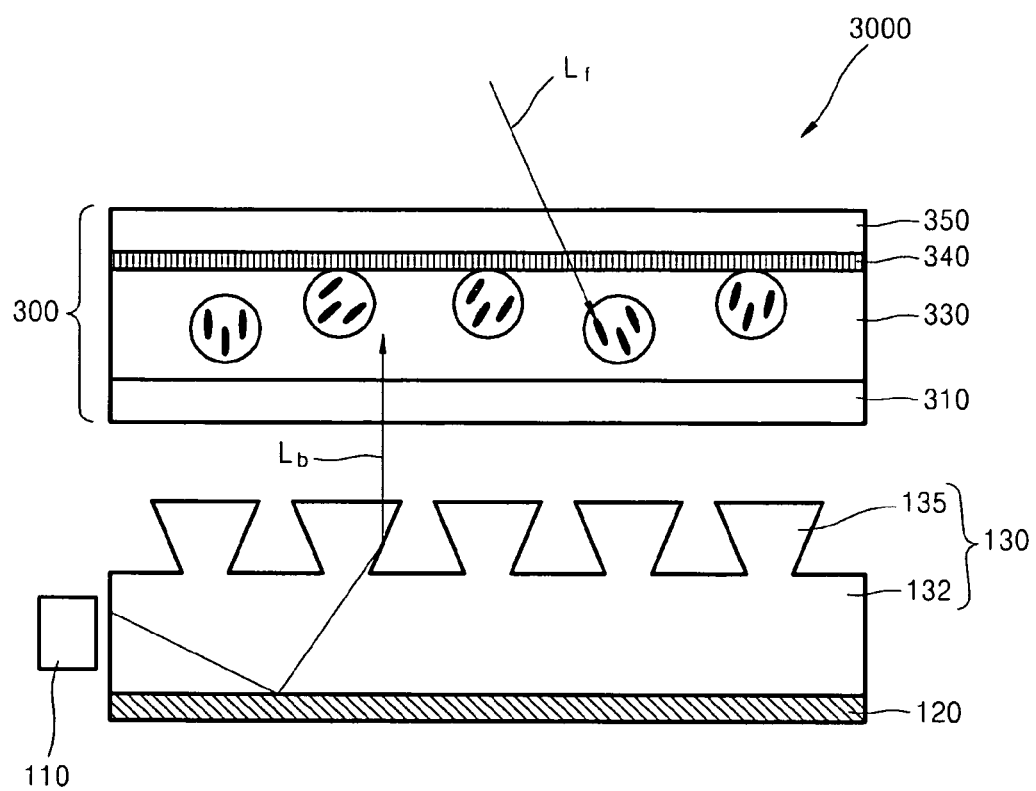

FIGS. 5A and 5B are cross-sectional views of the display apparatus of FIG. 4 modulating external light $L_f$ and light $L_b$ from the backlight unit. In FIG. 5A, voltage is applied to the PDLC layer 330 and liquid crystals are thereby arranged. In this case, a permittivity difference between the liquid crystals and the polymers is reduced and thus, PDLCs become transparent so as to allow light to pass through. Light $L_b$ incident from the light source 110 onto the all-in-one type light guide plate 130 and emitted from the light emitting members 135 passes through the transparent PDLC layer 330 and passes through the color filter 340, thereby generating a pixel-on state expressing the color corresponding to the color filter 340. In addition, external light $L_f$ incident from the front of the PDLC panel 300 passes through the transparent PDLC layer 330 and is incident to the all-in-one type light guide plate 130 through the light emitting members 135. Then, incident light is reflected at the reflective plate 120 and is emitted through the light emitting members 135. Next, the emitted light passes through the transparent PDLC layer 330 and the color filter 340 and a pixel-on state expressing the color corresponding to the color filter 340 is generated.

In FIG. 5B, voltage is not applied to the PDLC layer 330 and the liquid crystals are not arranged. As a result, the PDLCs are in a mode in which light is scattered due to a permittivity difference between the polymers and the liquid crystals and scattered light is absorbed in the PDLC layer 330 by the black dye mixed with the PDLCs. Light incident to the all-in-one type light guide plate 130 from the light source 110, emitted through the light emitting members 135, and incident to the PDLC panel 300 may not pass through the PDLC layer 330, which is in a state of absorbing light, and a pixel-off state is generated. In addition, external light $L_f$ is absorbed in the PDLC layer 330 and thus, a pixel-off state is generated.

Figure 6:
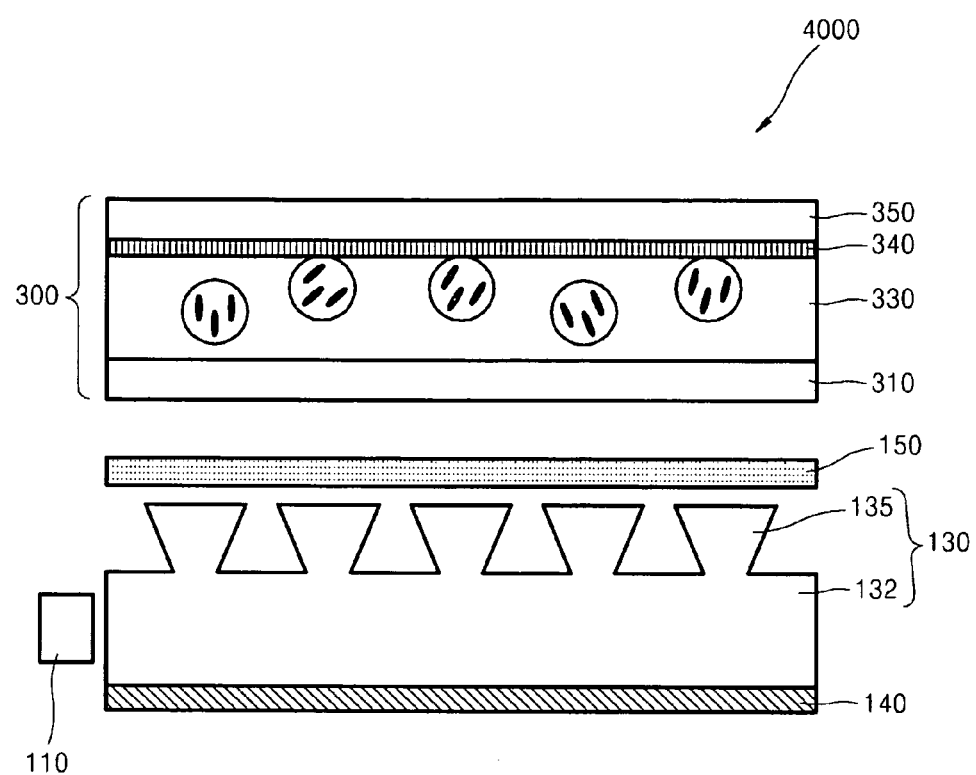
FIG. 6 is a cross-sectional view of another display apparatus according to example embodiments.

FIG. 6 is a cross-sectional view of another display apparatus according to example embodiments. The display apparatus 4000 may include a backlight unit and the PDLC panel 300. The backlight unit includes the light source 110, the all-in-one type light guide plate 130, the reflective plate 140, and the scattering plate 150. The display apparatus 4000 of FIG. 6 is different from the display apparatus 3000 of FIG. 4 in that the reflective plate 140 may be a mirror type reflective plate and the scattering plate 150 is interposed between the all-in-one type light guide plate 130 and the display panel 300 in FIG. 6, whereas the reflective plate 120 may be a scattering type reflective plate or a directional reflective plate in FIG. 4. A principle of forming an image in the display apparatus 4000 by using light from the backlight unit and external light is substantially the same as that used in the display apparatus 3000 in FIG. 4.

As described above, the display apparatuses 1000, 2000, 3000, and 4000 according to example embodiments may include the all-in-one type light guide plate, which emits light $L_b$ from the light source 110 toward the display panels 200 and 300 and reflects external light $L_f$ incident from the front of the display panels 200 and 300 so as to emit reflected light toward the display panels 200 and 300, so that light $L_b$ from the backlight unit and external light $L_f$ may be used as image forming light. Such display apparatuses have improved luminance and reduced power consumption, compared with a reflective type display apparatus only using external light incident from the front side of the display surface or a transflective type display apparatus using a liquid crystal cell region, which is divided into a reflective region and a transmittive region.

Figure 7:
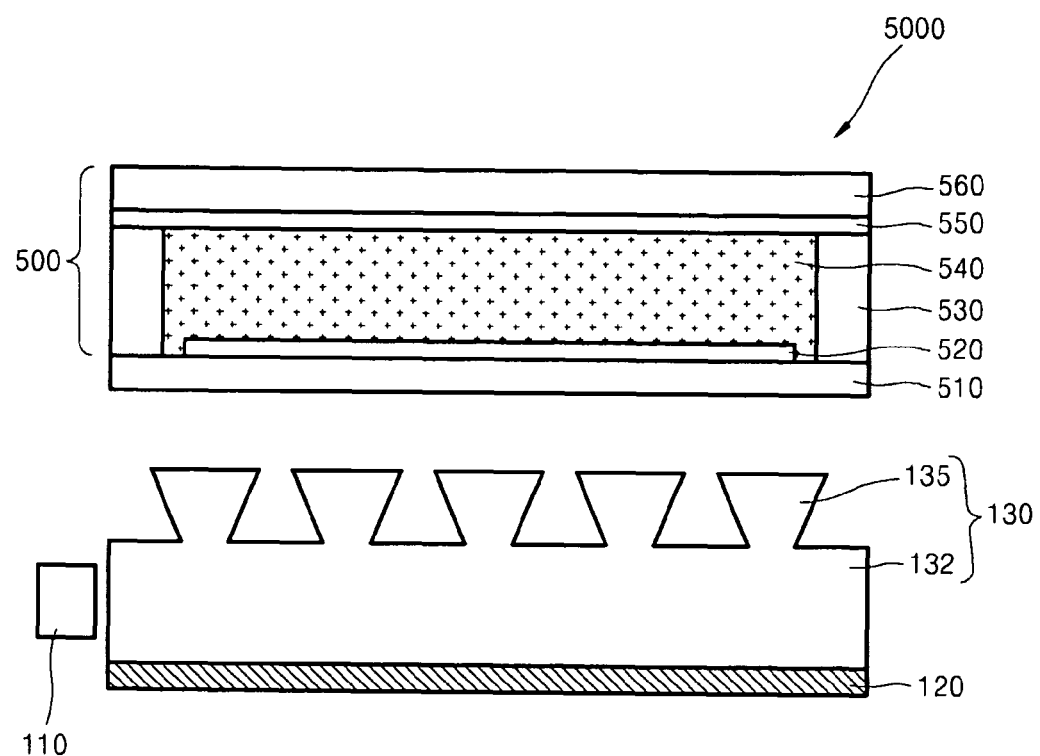
FIG. 7 is a cross-sectional view of another display apparatus according to example embodiments.

FIG. 7 is a cross-sectional view of another display apparatus according to example embodiments. The display apparatus 5000 may have a backlight unit (including the light source 110, the all-in-one type light guide plate 130, and the reflective plate 120) and an electrochromic display panel 500. The display apparatus 5000 of FIG. 7 is different from the other display apparatuses 1000, 2000, 3000, and 4000 in that the electrochromic display panel 500 is used as the display panel.

The electrochromic display panel 500 includes a transparent partition wall 530 and an electrochromic layer 540, wherein the transparent partition wall 530 partitions a space between a first substrate 510 and a second substrate 560, and the electrochromic layer 540 is disposed in the space formed by the transparent partition wall 530. The electrochromic layer 540 may be formed by, for example, mixing electrochromic elements with an electrolyte. The electrochromic element changes its color by using electrons or electron holes. For example, when the electrochromic element is mixed with an electrolyte and an electric field is applied to the mixture, electrons or electron holes are combined with the electrochromic element, thereby making a color appear or disappear. Transparent electrode layers 520 and 550, to which a voltage is applied for forming an electric field on the electrochromic layer 540, are respectively formed on a first substrate 510 and a second substrate 560 to face the electrochromic layer 540.

Figure 8:
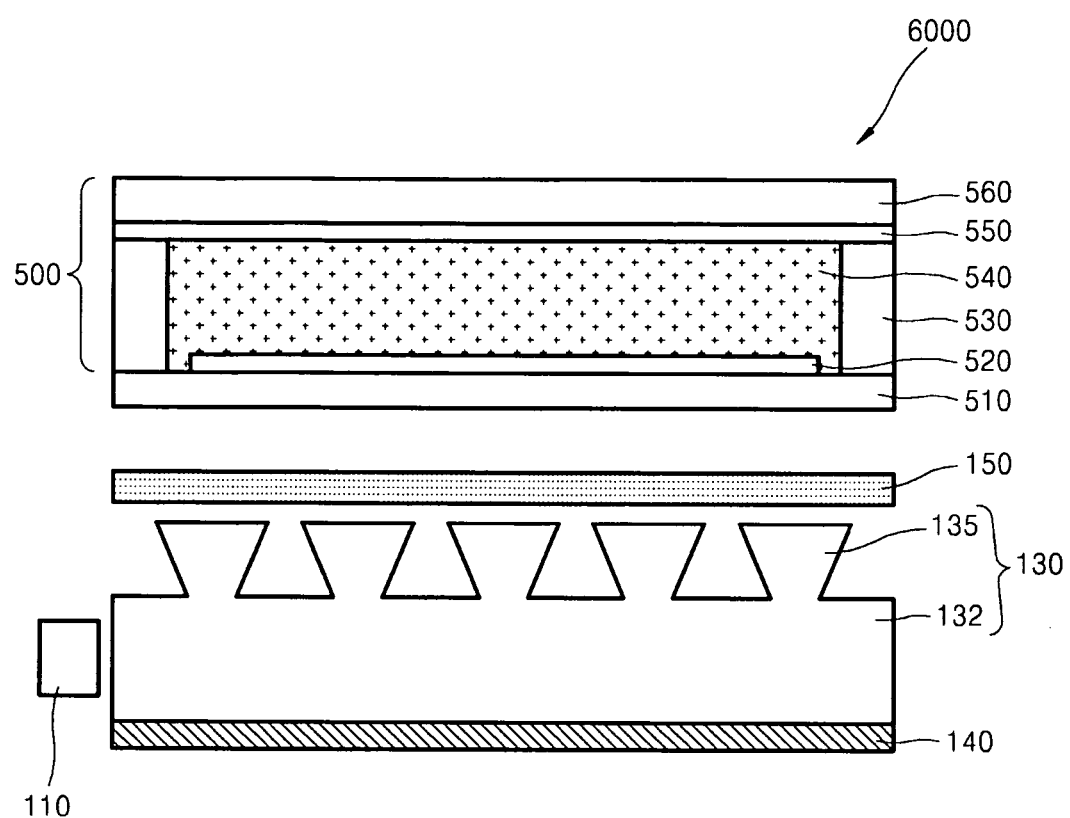
FIG. 8 is a cross-sectional view of another display apparatus according to example embodiments.

FIG. 8 is a cross-sectional view of another display apparatus according to example embodiments. The display apparatus 6000 may include a backlight unit and the electrochromic display panel 500. The backlight unit includes the light source 110, the all-in-one type light guide plate 130, the reflective plate 140, and the scattering plate 150. The display apparatus 6000 is different from the display apparatus 5000 of FIG. 7 in that a mirror type reflective plate is used as the reflective plate 140 and the scattering plate 150 is further disposed between the all-in-one type light guide plate 130 and the display panel 500.

Figure 9:
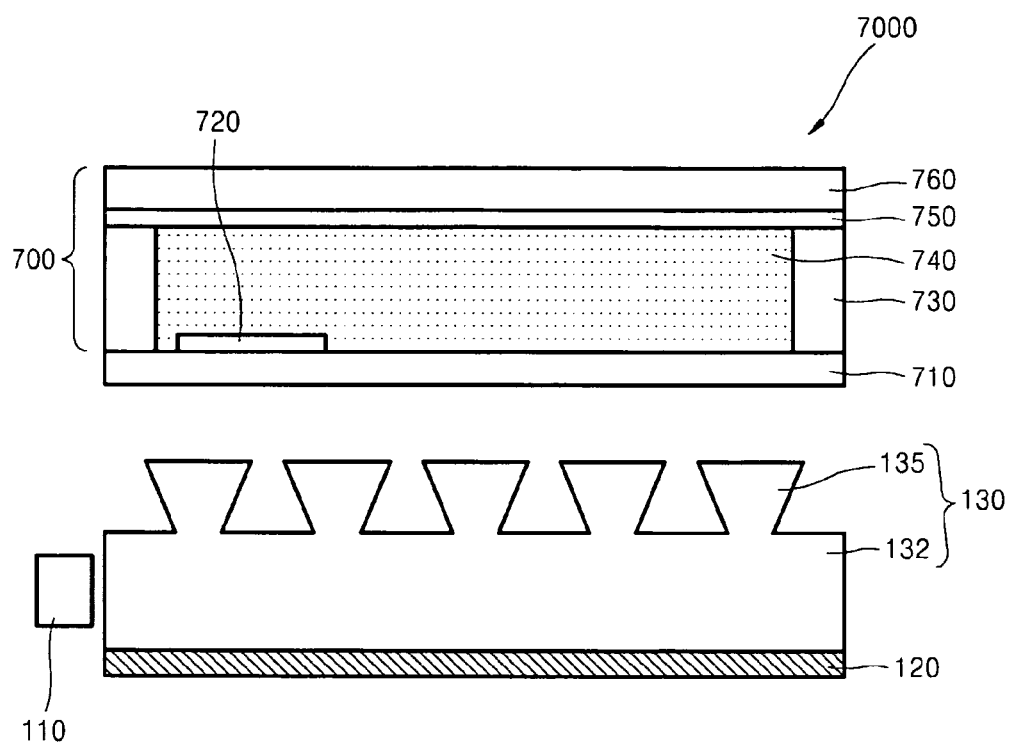
FIG. 9 is a cross-sectional view of another display apparatus according to example embodiments.

FIG. 9 is a cross-sectional view of another display apparatus according to example embodiments. The display apparatus 7000 may have a backlight unit (including the light source 110, the all-in-one type light guide plate 130, and the reflective plate 120) and an electro-wetting display panel 700. The display apparatus 7000 is different from the other display apparatuses above in that the electro-wetting display panel 700 is used as a display panel. The electro-wetting display panel 700 includes a transparent partition wall 730 and an electro-wetting layer 740, wherein the transparent partition wall 730 partitions a space between a first substrate 710 and a second substrate 760, and the electro-wetting layer 740 is disposed in the space. Electrowetting denotes a phenomenon of uniformly diffusing liquid state materials or centralizing liquid state materials to one side after changing a surface tension of an interface by an electric charge existing at the interface. Dye or pigment expressing a particular color may be mixed with the liquid state materials, and the mixture is applied to a display device. Transparent electrode layers 720 and 750, to which a voltage is applied for forming an electric field on the electro-wetting layer 740, are respectively formed on a first substrate 710 and a second substrate 760 to face the electro-wetting layer 740.

Figure 10:
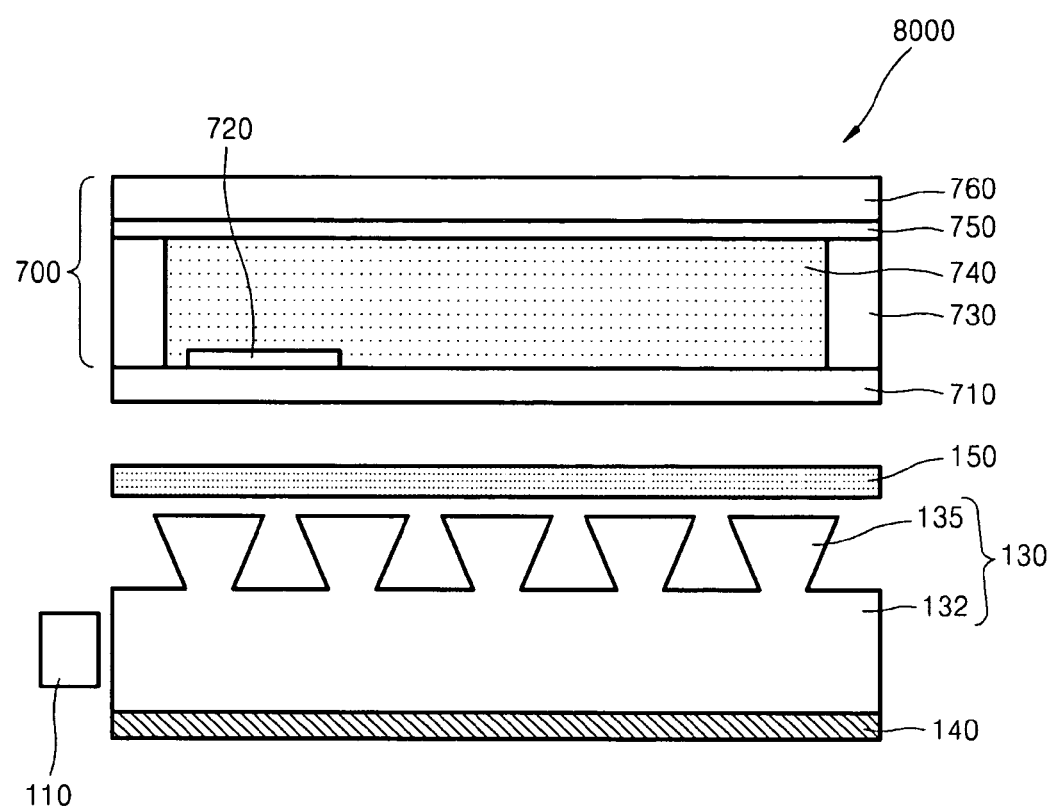
FIG. 10 is a cross-sectional view of another display apparatus according to example embodiments.

FIG. 10 is a cross-sectional view of another display apparatus according to example embodiments. The display apparatus 8000 may include a backlight unit and the electro-wetting display panel 700. The backlight unit includes the light source 110, the all-in-one type light guide plate 130, the reflective plate 140, and the scattering plate 150. The display apparatus 8000 is different from the display apparatus 7000 of FIG. 9 in that a mirror type reflective plate is used as the reflective plate 140 and the scattering plate 150 is further disposed between the all-in-one type light guide plate 130 and the display panel 700.

The display apparatuses 5000, 6000, 7000, and 8000 according to the above embodiments include the all-in-one type light guide plate, which emits light $L_b$ from the light source 110 toward the display panels 500 and 700 and reflects external light $L_f$ incident from the front of the display panels 500 and 700 so as to emit reflected light toward the display panels 500 and 700, and thus, light $L_b$ from the backlight unit and external light $L_f$ may be used as image forming light. Alternatively, an electrophoretic display panel or a Micro Electro Mechanical System (MEMS) shutter may be used as a display panel. In the all-in-one type light guide plate 130, the light emitting members 135 may be formed in various forms and distributions.

Figure 11:
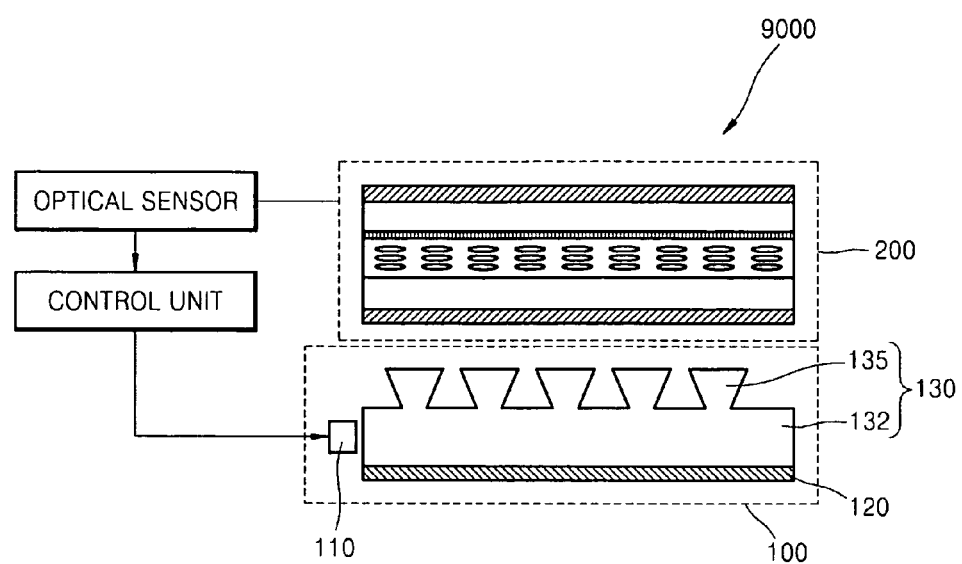
FIG. 11 is a cross-sectional view of another display apparatus according to example embodiments.

FIG. 11 is a cross-sectional view of another display apparatus according to example embodiments. The display apparatus 9000 may include a backlight unit 100 (having the light source 110), a display panel 200, an optical sensor for detecting external light intensity, and a control unit for controlling the brightness of the light source 110 according to the external light intensity detected by the optical sensor. The backlight unit 100 includes the light source 110, the all-in-one type light guide plate 130, and the reflective plate 120. As described above, light from the light source 110 is emitted to the display panel 200 by the all-in-one type light guide plate 130 and light incident from the front of the display panel 200 is reflected back toward the display panel 200. The display panel 200 of FIG. 11 may be a liquid crystal panel as illustrated in FIG. 1. However, the PDCL panel, the electrochromic display panel, the electro-wetting display panel, the electrophoretic display panel, and the MEMS shutter as described in the above examples may also be used as the display panel 200. The optical sensor is configured to detect the intensity of external light incident to the display panel 200, and may be manufactured simultaneously with the display panel 200 or may be separately manufactured and assembled. The brightness of the light source 110 is controlled by the control unit according to the external light intensity detected by the optical sensor. When external light and light from the backlight unit are used together as image forming light, the brightness of the light source 110 may be controlled so as to maintain an appropriate luminance. Also, according to a surrounding environment, any one of the external light and the light from the backlight unit may be used so as to reduce power consumption.

The display apparatuses according to example embodiments may include the all-in-one type light guide plate, wherein the light guide member and the light emitting members are integrally formed together or individually combined to form an all-in-one type light guide plate. As discussed above, light from the backlight unit may be used along with external light as image forming light. Therefore, in the display apparatuses according to example embodiments, suitable luminance and outdoor visibility may be attained while reducing power consumption.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A display apparatus comprising:
   a light source;
   an all-in-one type light guide plate including a light guide member and light emitting members, wherein the light guide member reflects light incident from the light source toward the light emitting members, and the light emitting members protrude from a first surface of the light guide member and emit light incident from the light guide member;
   a reflective plate on a second surface of the light guide member, the second surface being on an opposing side of the light guide member from the first surface; and
   a display panel configured to modulate light emitted from the all-in-one type light guide plate to form an image.

2. The apparatus of claim 1, wherein the display panel is a liquid crystal panel.

3. The apparatus of claim 1, wherein the display panel is a polymer dispersed liquid crystal (PDLC) panel in which black dye is mixed with PDLC.

4. The apparatus of claim 1, wherein the display panel is an electro-wetting display panel which modulates light using an electro-wetting material.

5. The apparatus of claim 1, wherein the display panel is an electrochromic display panel which modulates light using an electrochromic element.

6. The apparatus of claim 1, wherein the reflective plate is a scattering type reflective plate.

7. The apparatus of claim 1, wherein the reflective plate is a directional reflective plate.

8. The apparatus of claim 1, wherein the reflective plate is a mirror type reflective plate.

9. The apparatus of claim 1, further comprising:
   a scattering plate between the all-in-one type light guide plate and the display panel.

10. The apparatus of claim 1, wherein each of the light emitting members has a larger cross-section for a first portion where light is emitted than a cross-section for a second portion where light is incident from the light guide member.

11. The apparatus of claim 1, wherein a distribution density of the light emitting members increases with increasing distance of the light emitting members from the light source.

12. The apparatus of claim 1, wherein a size of the light emitting members increases with increasing distance of the light emitting members from the light source.

13. The apparatus of claim 1, further comprising:
   an optical sensor configured to detect external light intensity; and
   a control unit configured to control brightness of the light source according to the external light intensity detected by the optical sensor.

14. The apparatus of claim 1, wherein a horizontal cross-section of at least one of the light emitting members increases with increasing distance away from the light guide member.

15. The apparatus of claim 1, wherein an uppermost surface of at least one of the light emitting members is parallel to an uppermost surface of the light guide member.

16. The apparatus of claim 1, wherein the light emitting members are spaced apart from each other by planar portions of the light guide member.

* * * * *